July 13, 1954     M. KATZ     2,683,449
CONTAINER AND CHEMICAL HEATER
Filed Nov. 6, 1951
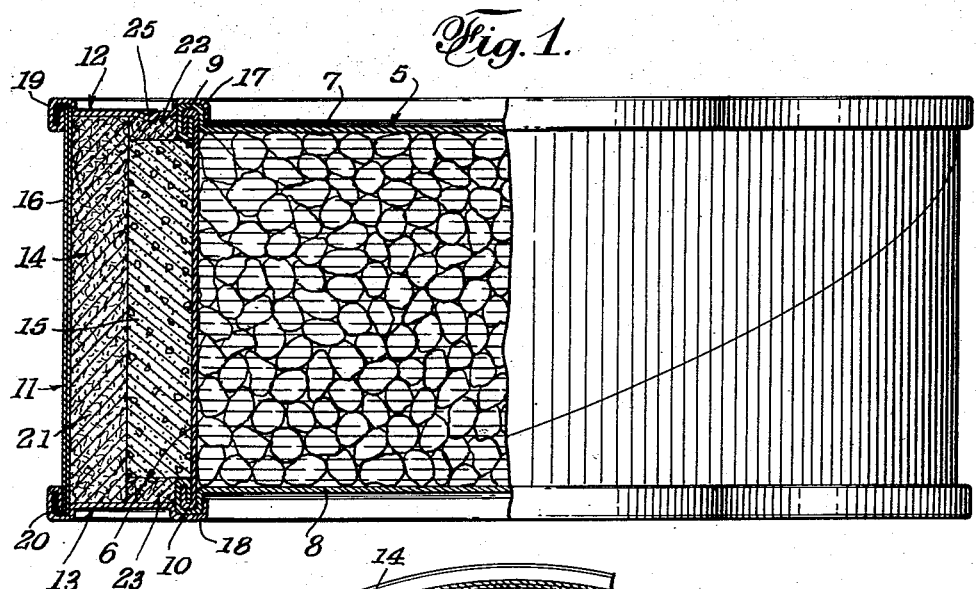
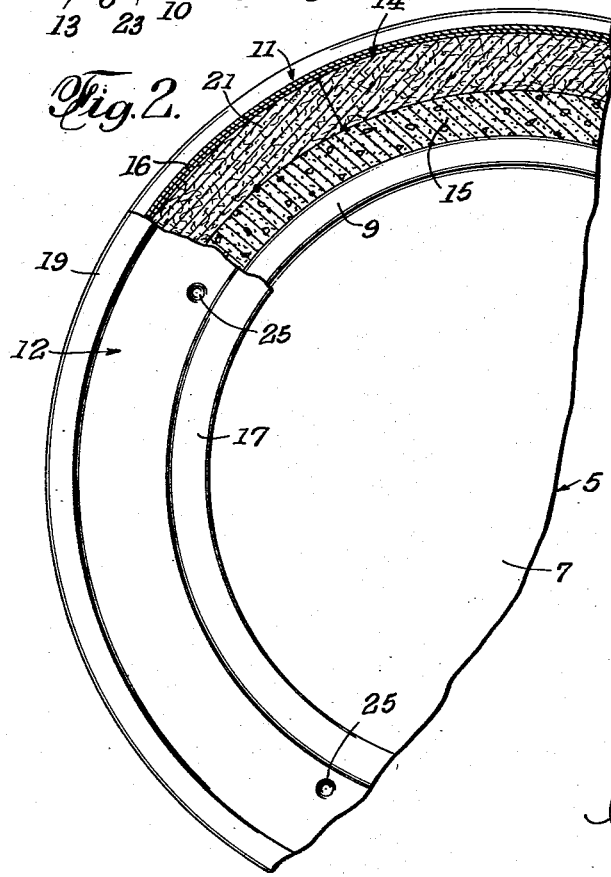
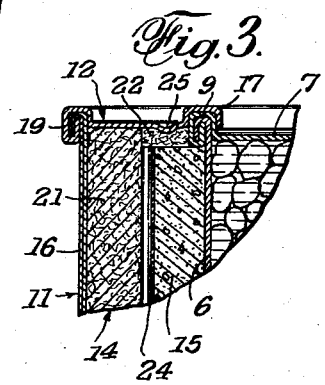
INVENTOR.
MANFRED KATZ
BY
ATTORNEY Patented July 13, 1954

2,683,449

UNITED STATES PATENT OFFICE 2,683,449

CONTAINER AND CHEMICAL HEATER

Manfred Katz, Los Angeles, Calif., assignor to United Food Services, Inc., Wilmington, Del., a corporation of Delaware Application November 6, 1951, Serial No. 255,047

5 Claims. (Cl. 126—263)

This invention relates to improvements in self-heating food containers, the primary object of the present invention being to provide a self-heating food container that can be conveniently handled after heat generation has been instituted without discomfort and without danger of burning the fingers.

This application is a continuation-in-part of my pending application, Ser. No. 241,626, filed August 13, 1951, now abandoned.

Since self-heating containers are made with an annulus of heat-generating chemical around a sealed food can and within an exterior jacket, the temperature generated not only heats the can and its contents, but so intensely heats the jacket that facility of safe handling of the container, when opening the same, is materially impaired. This is particularly true of containers having jackets of thin gauge sheet metal. Accordingly, it is another object of the invention to provide a self-heating container with an external jacket that is non-metallic and of an inexpensive material that has extremely low heat conductivity.

Another object of the invention is to provide, in a container as indicated, a porous liner for the jacket primarily for insulating the jacket against heat generated therewithin, the porosity of the liner affording expansion space within the liner to absorb pressures created within the jacket when heat is generated therein. In addition to its heat insulating properties, it is contemplated that, in its preferred form, the liner have substantial thickness and be substantially incompressible and non-deformable.

Another object of the invention is to provide an insulating liner for the jacket of a self-heating container that is both porous and compressible.

Since a self-heating container of the type herein contemplated embodies end walls or plates that connect the food can and exterior jacket and, since these end walls or plates are advantageously made of sheet metal, it is further contemplated to provide heat-insulating and expansion-accommodating means between the heat-generating material and said walls or plates.

A more specific object of the invention is to provide heat-insulating means of the character indicated that comprises pre-formed liner elements of substantially incompressible glass wool.

My invention also has for its objects to provide a self-heating container of the character referred to that is of simple construction and is economical to manufacture.

The invention also comprises novel details of construction and novel combinations and arrangements of parts which will more fully appear in the course of the following description of the illustrated preferred embodiments of the invention.

In the drawing, in which like reference characters represent similar parts in the several views:

Fig. 1 is an elevational view, in quarter section, of a preferred form of self-heating container embodying features of the invention.

Fig. 2 is a broken plan view thereof, partly in horizontal section.

Fig. 3 is a fragmentary cross-sectional view of another form of the invention.

A hermetically sealed food-containing can 5 constitutes the core around which the present improved structure is provided. Said can 5 is of the conventional cylindrical type, having an annular wall 6 and opposite end walls 7 and 8 that are interconnected by annular crimps or beads 9 and 10, respectively.

The present improvements comprise, generally, a jacket 11 encircling can 5, opposite ring members 12 and 13 connecting the can 5 and jacket 11 to define an annular space around the can, heat-insulating means 14 lining the jacket and ring members, and heat-generating means 15 in said annular space and separated from the jacket and ring members by the means 14.

The jacket 11 is preferably formed of a non-metallic material. As at present contemplated, said jacket is formed as a fiberboard tube 16 of the type that is seamless, the same being formed of helical convolutions comprising two or more adhesive-connected plies. It will be evident that such tubes have low heat conductivity relative to that of sheet metal.

Ring members 12 and 13 are preferably made of sheet metal and, at their inner edges, are formed with channels 17 and 18 that tightly fit over the respective can beads 9 and 10 to seal therearound. The outer edges of rings 12 and 13 are intercrimped with the opposite ends of jacket tube 16 to form annular beads 19 and 20.

Heat-insulating means 14 comprises an annulus 21 of material of which glass wool and rockwool are preferred examples. The same is positioned to form an inner liner for jacket 11 and preferably extends to and between rings 12 and 13. Such materials not only have desired heat-insulating properties but will also absorb any expansive forces that may be generated by the means 15 within the annular space between can 5 and liner 21. Said means 14 also includes liner rings 22 and 23 located against the inner faces of rings 12 and 13, respectively. Said rings may be made of the same material as that of liner 21 and, thereby, have the same properties as said liner.

Both glass wool and rockwool are fibrous porous materials. The former can be treated in well-known ways to be substantially incompressible and, for all practical purposes, non-deformable. In fact, such glass wool will break or crumble rather than deform under high pressures or forces. Glass wool will become non-deformable and retain its porosity if the fibers thereof are lightly coated with thermo-setting or air-setting phenolic resins and heat sufficient to thermo-set the resin coating, if the former is used, is applied. Rockwool, however, is deformable. Both are adapted to absorb the mentioned generated pressures, the former without deformation and the latter by becoming compressed. Also, both materials are excellent heat insulators.

In practice, liner 21 is made of two or more abutted arcuate sections slidingly fitted into jacket tube 16.

As shown in Fig. 3, a corrugated paper or cardboard annulus 24 may be interposed between the means 14 and 15 to serve as a partition between the porous mass of means 14 and the granular mass of means 15 particularly when the means 14 is formed of rockwool.

Assembly of the structure is relatively simple. Annular bead 20 is made to connect jacket 11 and ring 13. The can 5 is then set with its bead 16 fitted into channel 18. Insulating means 14, whether in the form of a tube or a set of arcuate sections, and liner ring 23 are then slipped into place, and the unslaked lime or comparable filler 15 is then placed in the space provided therefor. After liner ring 22 is slipped into position, ring 12 is fitted over can 5 and the crimp bead 19 is formed to complete the assembly. Other suitable methods of assembly may be employed.

It will be seen that beads 19 and 20 provide strength for the container against circumferentially applied forces, and that the can 5 supplies strength against endwise applied forces. Thus, the fiberboard jacket 11 is structurally supported by strong metal parts.

Before can 5 is to be opened for removal of its contents, the same is heated by first puncturing ring 12 at dimples 25 so that a suitable quantity of liquid, preferably water, may be introduced into filler 15. The resultant exothermic reaction heats the food in the can but the heat generated is insulated from jacket 11 and rings 12 and 13 to, thereby, achieve the purposes of the present invention.

Since filler 15, when dry, is in a coarse granular form, the same may inadvertently spill through the punctures in ring 12. Because of the high absorptive properties of the filler, even when supplied with liquid, the same may still be in a spillable state since much of the granular consistency is retained. The fibrous liner ring beneath the punctures serves to seal against such accidental spillage.

While I have described what I now regard as the preferred forms of my invention, I do not wish to restrict myself to said forms, but desire to avail myself of all modifications that may fall within the spirit and scope of the appended claims.

Having thus described my invention, what I claim and desire to obtain by Letters Patent, is:

1. In a self-heating container having a food-containing can and a quantity of heat-generating material surrounding said can, a pair of rings engaged with and forming circumferential extensions of the opposite ends of said can, a non-metallic tube connected at its ends to the peripheries of the rings and constituting an outer jacket spaced from said heat-generating material, a non-deformable insulating liner occupying said space and extending between the mentioned rings, and annular liners of non-deformable insulating material interposed between said rings and the heat-generating material.

2. In a self-heating container having a central sealed food-containing can and a surrounding jacket defining an annular space around said can, there being a quantity of heat-generating material in said space and contiguous to said can, and a non-deformable and porous heat-insulating liner interposed between the jacket and said material to absorb expansion forces generated by exothermic reaction resulting from introduction of liquid into said heat-generating material through said jacket.

3. In a self-heating container having a central sealed food-containing can and a surrounding jacket defining an annular space around said can, there being a quantity of heat-generating material in said space and contiguous to the can, and a heat-insulating liner comprising non-deformable porous glass wool interposed between the jacket and said material to absorb expansion forces generated by exothermic reaction resulting from introduction of liquid into said heat-generating material through said jacket.

4. In a self-heating container having a food-containing can and a quantity of heat-generating material surrounding said can, a pair of rings engaged with and forming circumferential extensions of the opposite ends of said can, a non-metallic tube connected at its ends to the peripheries of the rings and constituting an outer jacket spaced from said heat-generating material, and a porous insulating liner occupying said space and extending between the mentioned rings, said insulating liner comprising non-deformable porous glass wool adapted to absorb expansion forces resulting from exothermic reaction attending introduction of liquid into said heat-generating material through punctures in one of said rings.

5. In a self-heating container having a food-containing can and a quantity of heat-generating material surrounding said can, a pair of rings engaged with and forming circumferential extensions of the opposite ends of the can, a non-metallic tube connected at its ends to the peripheries of the rings and constituting an outer jacket spaced from said heat-generating material, and a porous insulating liner occupying said space and extending between the mentioned rings, said insulating liner comprising glass wool formed into non-deformable and abutted arcuate sections.

References Cited in the file of this patent

UNITED STATES PATENTS

| Number | Name | Date |
| --- | --- | --- |
| 865,940 | Randolph | Sept. 10, 1907 |
| 1,306,808 | Ford | June 17, 1919 |
| 2,033,517 | Gazda | Mar. 10, 1936 |
| 2,036,611 | Simmons | Apr. 7, 1936 |
| 2,265,172 | Katz | Dec. 9, 1941 |
| 2,425,900 | Steven | Aug. 19, 1947 |
| 2,553,878 | Steven | May 22, 1951 |

FOREIGN PATENTS

| Number | Country | Date |
| --- | --- | --- |
| 40,523 | Switzerland | Apr. 19, 1916 |